Nov. 18, 1969    T. E. MARION    3,478,627
TUBE CUTTER
Filed Feb. 2, 1967    2 Sheets-Sheet 1
FIG. 1.
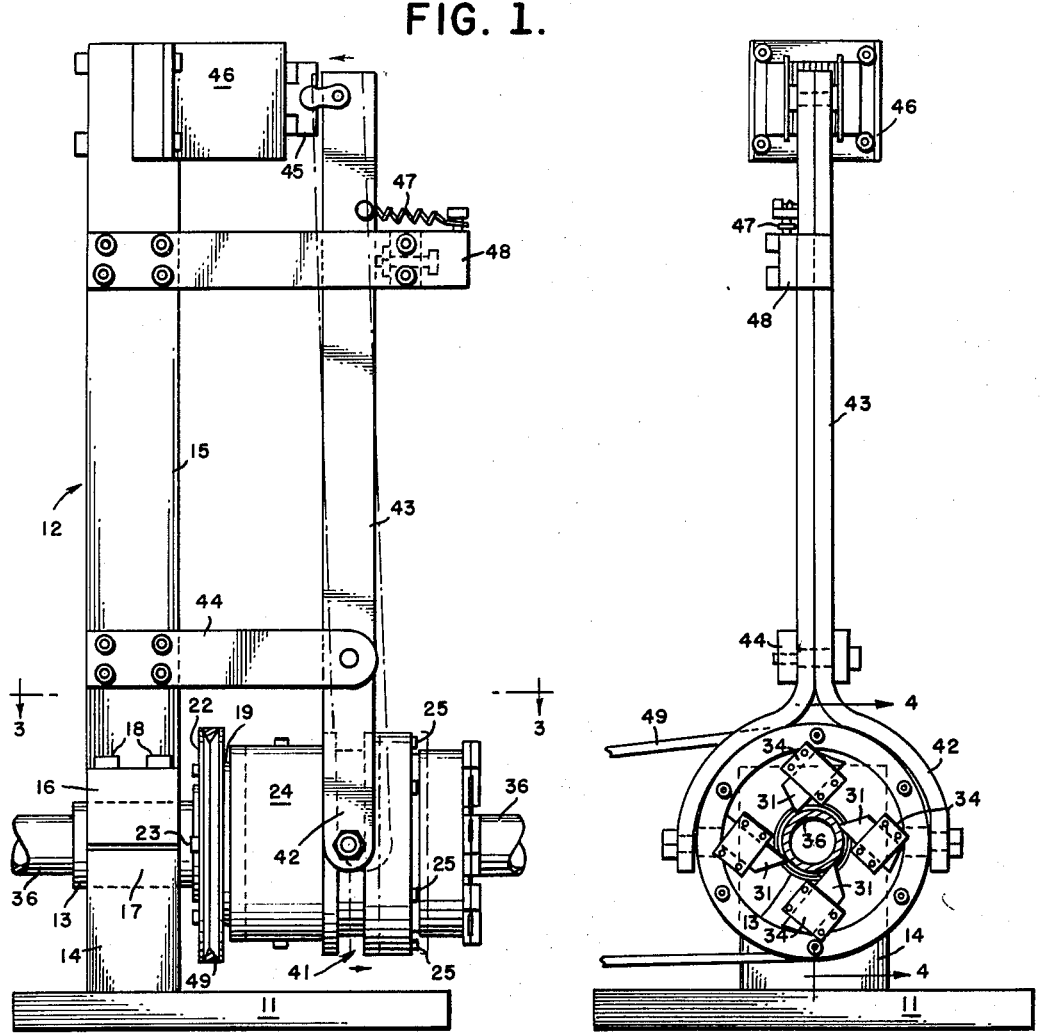
FIG. 2.
FIG. 3.
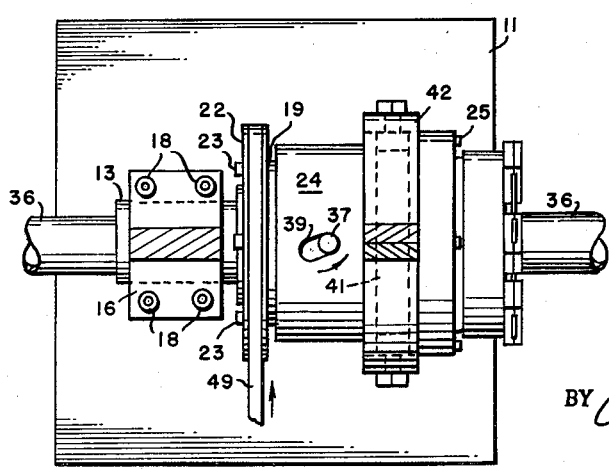
INVENTOR
THOMAS E. MARION
BY *Albert J. Kramer*
ATTORNEY INVENTOR
THOMAS E. MARION
BY Albert J. Kramer
ATTORNEY United States Patent Office 3,478,627
Patented Nov. 18, 1969

1

3,478,627
TUBE CUTTER
Thomas E. Marion, Baltimore, Md., assignor to Universal Machine Co., Inc., Baltimore, Md., a corporation of Maryland
Filed Feb. 2, 1967, Ser. No. 613,552
Int. Cl. B23b 3/04, 5/14
U.S. Cl. 82—70.2    4 Claims

ABSTRACT OF THE DISCLOSURE

A tube cutter in which a tube to be cut is placed in a tube holder which rotatably carries an inner and an outer collar. Coplanar blades to cut the tube are disposed at one end of the tube holder on one collar. These blades are normally in retracted position but can be protracted to cut the tube during rotation of the collars on axial and rotational movement fo the collars relative to each other.

---

This invention relates to tube cutters and it is more particularly concerned with means for automatically cutting lengths of tubing as may be required in any particular case.

An object of the invention is the provision of a tube cutter which is automatically operated by the simple actuation of a lever.

Another object is the provision of a tube cutter which employs a group of coplanar cutting members and which members are adapted to coact simultaneously when it is desired to cut a tube.

Still other objects and advantages of the invention will appear more fully from the following description considered together with the accompanying drawing.

In the drawing:

FIG. 1 is a side elevational view of an embodiment of the invention.

FIG. 2 is an end elevational view of the same embodiment.

FIG. 3 is a plan sectional view along the line 3—3 of FIG. 1.

Figure 4:
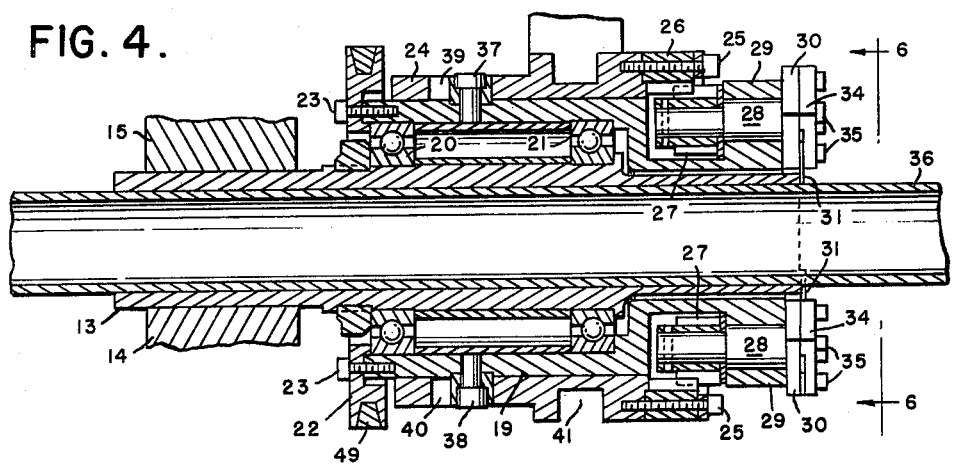
FIG. 4 is a sectional view along the line 4—4 of FIG. 2.
Figure 5:
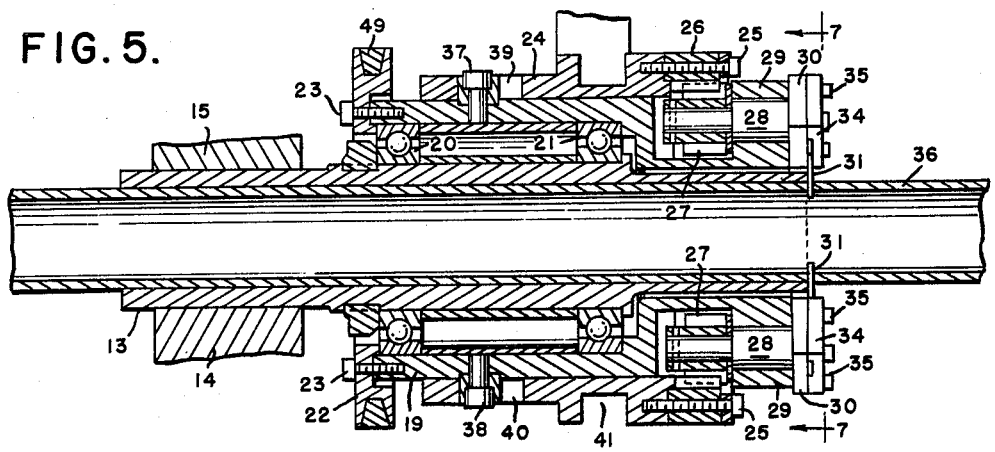
FIG. 5 is a view similar to FIG. 4 with the cutting means actuated to their inner operative positions.

Referring to the drawing with more particularity the embodiment illustrated comprises a base 11 adapted to support the structure as a whole and a vertical two part column 12. A hollow tubular member 13 is clamped between the lower part 14 of the column and the upper part 15 by means of flanges 16, 17 and flange bolts 18.

The tubular member 13 extends cantileverwise from the column 12 and is adapted to rotatably carry an inner collar 19. Suitable bearings 20, 21 are provided between the collar and the tubular member.

To the inner end of the collar 19 there is secured a grooved pulley wheel 22 by bolts 23.

Rotatably carried on the outer surface of the inner collar 19 is an outer collar 24. To the outer end of the outer collar 24 there is secured by bolts 25 an internal ring gear 26.

A portion of the outer section of the inner collar is recessed to receive a series of pinion gears 27 (four shown) in meshed relation with the internal ring gear 26.

2

Figure 6:
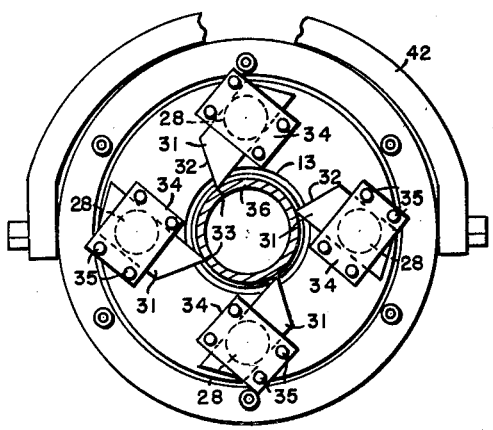
FIG. 6 is a sectional view along the line 6—6 of FIG. 4.
Figure 7:
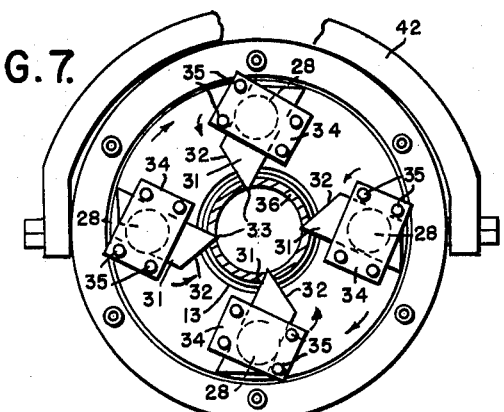
FIG. 7 is a sectional view along the line 7—7 of FIG. 5.

Each pinion gear 26 is mounted on a shaft 28 which is journaled in a boss 29 at the outer end of the inner collar. The outer end of the shafts 28 are flanged to provide mounting heads 30 for coplanar cutting blades 31. Each cutting blade has a sharp edge 32 and a pointed end 33. It is held on a mounting head 30 by an overlying plate 34 and bolts 35. The cutting blades 31 are so mounted that the pointed ends 33 are normally out of the path of a tube 36 to be cut when the tube is disposed within the hollow tubular member 13 (see FIG. 6) but is rotated to be within the path of the tube when the outer collar 24 is rotated a limited amount relative to the inner collar 19 (see FIG. 7).

The inner and outer collars are limited to these two relative positions by means of pins 37, 38 secured to the inner collar and projecting through diagonal slots 39, 40, respectively, of the outer collar.

The outer collar is provided with a circumferential groove 41 that engages a yoke 42 at the lower end of an arm 43. The arm 43 is fulcrumed on a bracket 44 which is secured to and extends outwardly from the column 12. The upper end of the arm 43 is connected to the armature 45 of a solenoid 46 carried at the upper end of the column 12.

The outer collar is normally biased to the nonoperative position of the cutting members 31 by means of a tension spring 47 between the arm 43 and a bracket 48 secured to and extending outwardly from the column 12.

The operation of the device is as follows: A tube 36 to be cut is passed through the opening of the tubular member 13 and the collars 19 and 24 are rotated under the action of a conventional powered belt 49 engaging the pulley wheel 22. The cutting members 31 are held in their retracted position by the spring 47 acting on the arm 43 which, through the yoke 42, keeps the outer collar 24 in its inner position relative to the inner collar 19 as determined by the pins 37, 38 in the slots 39, 40. The tube is set to a position of desired cutoff whereupon the solenoid 46 is electrically actuated by conventional means. This causes the armature 45 to pull the arm 43 inwardly against the action of the spring 47 thereby causing the yoke 42 and the outer collar 24 to move outwardly relative to the inner collar 19 within the limits of the pins 37, 38 in the diagonal slots 39, 40. This produces a slight rotational movement of the outer collar which causes the pinion gears 27 to rotate slightly relative to the internal gear 26 with which they are in meshed relation. This causes the cutting edges of the blades 31 to protract inwardly and contact the tube 36 whereupon the tube is completely cut transversely. The solenoid 46 is then deenergized whereby the spring 47 returns the arm 43 to its normal position resulting in a retraction of the blades 31.

I claim:

1. A tube cutter comprising a tubular member in which a tube to be cut is disposed, an inner collar rotatably mounted on the tubular member, means for continuously rotating said inner collar on said tubular member, an outer collar mounted for rotation and for longitudinal translation on the inner collar, a blade mounted on the outer collar for pivotal movement between a normally nonoperative position and an operative position for cutting a tube disposed in said tubular member, said outer collar having a circumferential groove, a yoke engaging said groove, a lever having one end connected to the yoke and the other end to a spring to bias the lever in one direction, a solenoid for selectively overriding the bias of the spring to move the lever in the opposite direction, said outer collar having a diagonal slot, a pin slidably engaging said slot, said pin being secured to the inner collar, a pinion gear mounted on the inner collar and connected to the blade for rotating the blade between its operative and nonoperative positions, a ring gear meshed with said pinion gear and secured to said outer collar, whereby when the lever is moved by the spring or solenoid the blade is in nonoperative position or operative position, respectively.

2. A tube cutter as defined by claim 1 in which the means for continuously rotating the inner collar comprises a grooved pulley secured to the inner collar and a belt engaged with the pulley.

3. A tube cutter as defined by claim 1 in which a group of blades are mounted in coplanar relation and said blades are simultaneously actuated between nonoperative and operative positions.

4. A tube cutter as defined by claim 1 in which a group of blades are mounted in coplanar relation, said blades being connected each to a different pinion gear, all the pinion gears being in meshed relation with a single ring gear.

References Cited
UNITED STATES PATENTS

| | | | |
|---|---|---|---|
| 736,799 | 8/1903 | Tindel | 82—20 |
| 1,272,508 | 7/1918 | Owen | 82—70.1 |
| 1,288,283 | 12/1918 | Taylor | 82—72 |
| 1,797,944 | 3/1931 | Dustan | 82—20 |
| 2,112,396 | 3/1938 | Corrigan | 82—20 X |
| 2,415,746 | 2/1947 | Knight | 82—20 X |
| 2,459,075 | 1/1949 | Hibbard | 82—72 X |
| 2,484,601 | 10/1949 | Abbey | 82—20 |

HARRISON L. HINSON, Primary Examiner

U.S. Cl. X.R.

82—101